United States Patent [19]

Rigal et al.

[11] Patent Number: 5,660,278
[45] Date of Patent: Aug. 26, 1997

[54] METHOD AND A UNIT FOR PACKAGING A PLURALITY OF CARDS

[75] Inventors: Vincent Rigal, Sceaux; Alain Closson, Quilleboeuf S/Seine, both of France

[73] Assignee: Schlumberger Industries, Montrouge, France

[21] Appl. No.: 573,659

[22] Filed: Dec. 18, 1995

[30] Foreign Application Priority Data

Dec. 16, 1994 [FR] France ................... 94 15295

[51] Int. Cl.$^6$ ................................. B65D 85/48
[52] U.S. Cl. ................... 206/454; 206/425; 53/157
[58] Field of Search ................... 206/425, 307, 206/706, 707, 713, 722, 723, 726, 728, 449, 454, 526; 53/445, 474, 157, 238

[56] References Cited

U.S. PATENT DOCUMENTS

| | | | |
|---|---|---|---|
| 1,943,587 | 1/1934 | Davis | 206/526 |
| 1,975,936 | 10/1934 | Goodwin | 206/526 |
| 2,008,837 | 7/1935 | Rumsey, Jr. | 206/526 |
| 2,111,932 | 3/1938 | Kennedy | 40/669 |
| 2,967,611 | 1/1961 | Bolinger | 206/449 |
| 3,313,407 | 4/1967 | Palm, Jr. | 206/461 |
| 3,902,595 | 9/1975 | Mori | 206/425 |
| 3,952,872 | 4/1976 | Consiglio, Jr. | 206/526 |
| 4,643,306 | 2/1987 | Ryan | 206/425 |
| 5,497,882 | 3/1996 | Kenyon | 206/526 |

FOREIGN PATENT DOCUMENTS 6020310  1/1994  Japan.

OTHER PUBLICATIONS

IBM Technical Disclosure Bulletin, vol. 33, No. 2, Jul. 1990, pp. 181–185.

Primary Examiner—Paul T. Sewell
Assistant Examiner—Nhan T. Lam
Attorney, Agent, or Firm—Frishauf, Holtz, Goodman, Langer & Chick, P.C.

[57] ABSTRACT

A method and a unit for packaging a plurality of cards, in particular memory cards, with opposing surfaces of successive cards being adjacent to one another. Each of the cards includes at least one surface that can be damaged by contact or exposure to another card. A plurality of dividers is provided, each divider including fastening means for securing each divider to another divider. Each divider is placed between two successive cards in such a manner that each damageable surface is protected by a divider. The fastening means cooperate mutually in order to fasten together the plurality of dividers so that they can be removed simultaneously.

20 Claims, 2 Drawing Sheets

METHOD AND A UNIT FOR PACKAGING A PLURALITY OF CARDS

The present invention relates to a method and a unit for packaging a plurality of cards, in particular memory cards, with respective opposing surfaces of successive cards being adjacent to one another, each card having at least one surface that is protected from being damaged upon contact with or exposure to another card.

BACKGROUND OF THE INVENTION

Memory cards are manufactured by installing an electronic module, such as a memory chip, in a cavity provided in a card body for that purpose and fixed therein by means of an adhesive which, for example, is based on cyanoacrylate. Cards made in this way are stacked or stored in such a manner that a surface of one card adjoins or abuts the surface of the adjoining card.

It is often observed that the cards sustain some damage when stored in this way immediately after the operation of fixing the module to the card body. The damage occurs on an area of each card that is located facing an electronic module. Depending on circumstances, the damage occurs to a transparent protective varnish, to a transparent protective plastic layer, or to the printing ink. The damage is believed to be the result of degassing from the adhesive used. It may be of little consequence when exposure to such degassing happens to cards that do not have any pattern formed on a surface thereof. However, exposure of cards having a more elaborate visual appearance on their outer surfaces to such degassing is unacceptable due to the resultant damage which they sustain.

Cards are stored together in this way generally for the purpose of facilitating a subsequent processing such as, for example, handling, storage, shipping, and/or additional operations. In particular, cards may be subjected to personalization processing for a specific user, such as marking and applying magnetic tracks. The cards are stored against one another since that is how they need to be presented for such processing. The subsequent processing may take place either in the factory or on a customer's premises. For example, operations such as packaging in individual envelopes or personalization take place on customer premises. The term "processing" must be understood broadly. It may comprise no more than a handling operation or it may comprise an operation that is much more sophisticated.

A solution to this card damage problem which requires changing either the adhesive or changing the varnish or protective layer is not desirable. Each of these substances is presently chosen on the basis of an optimum compromise of respective properties and advantages. The particular adhesive is used for its effectiveness, and the protective layer or varnish is used for a collection of properties and, in particular, its ability to dissipate static electricity, to retain a magnetic track, and to withstand scratching.

Another solution would avoid the deterioration of cards in this way by delaying storage thereof for a certain period of time until the degassing of the adhesive ends. A further solution is to store the cards temporarily in a receiving element where they are kept apart from one another. In some cases, the machine which manufactures the cards can have a storage magazine in which the cards are kept separated from one another. These solutions are incompatible with meeting delivery deadlines, since the time required for degassing is relatively long, and may be as much as several days. Also, they would require a considerable amount of space to store the cards and would tie up goods in progress.

Another drawback of using such a receiver element is that it does not facilitate subsequent operations. Cards would need to be handled one by one to group them together for subsequent processing.

SUMMARY OF THE INVENTION

An object of the invention is to eliminate the above drawbacks by preventing memory cards from being damaged after the manufacturing process and by facilitating subsequent processing.

To this end, one aspect of the invention is directed to a method of packaging a plurality of cards, in particular memory cards, with their faces adjacent to one another, each of said cards including at least one surface that can be damaged with contact or by exposure to another card. A plurality of dividers is provided, each divider including fastening means enabling it to be secured to other dividers. Each divider is placed between two successive cards in such a manner that each damageable surface is protected by a divider element and so that the fastening means are ready to cooperate mutually in order to fasten together the plurality of dividers.

In another step of the method, prior to performing subsequent processing on cards or to using them, a portion of more than one of the plurality of divider elements are fastened together, and the fastened-together divider elements are withdrawn simultaneously, thereby grouping together the portion of the cards.

Another aspect of the invention is directed to a packaging unit containing a plurality of cards, in particular memory cards, disposed adjacent to one another. Each of the cards includes at least one surface that is damageable upon contact with or exposure to another card. A packaging unit for receiving a plurality of cards includes means for holding the cards with their faces being adjacent to one another. A plurality of removable divider elements are disposed in the packaging unit in alternation with the cards so that each damageable surface is protected by a respective divider element. Each of the dividers includes fastening means suitable for fastening together the plurality of dividers.

BRIEF DESCRIPTION OF THE DRAWINGS

Other characteristics and advantages of the present invention will be readily apparent from the following description of specific embodiments of the invention, provided with reference to the accompanying drawings, in which.

DETAILED DESCRIPTION OF THE INVENTION

Figure 1:
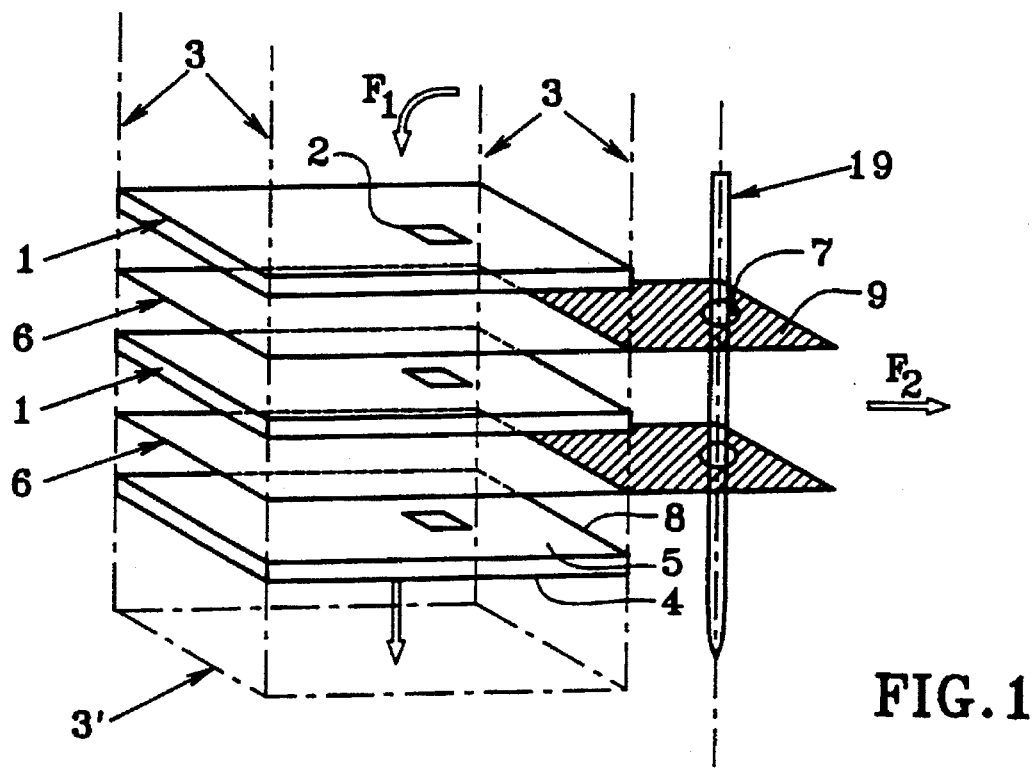
FIG. 1 shows a perspective view of manufactured memory cards being packaged.

FIG. 1 shows memory cards 1 as they appear at the end of a manufacturing process in which the electronic module 2 has been fixed to the card body by means of an adhesive (not shown) based on cyanoacrylate. Cards complete in this way arrive one by one on a conveyor belt (not shown) from which they are taken and placed into a packaging unit that has the overall shape of a rectangular parallelepiped. The machinery used for transferring the cards from the conveyor belt to the packaging unit is well known and can be, for example, vacuum operated and microprocessor controlled. No details thereof are deemed necessary.

The horizontal cross-section of the packaging unit corresponds substantially to the area of a card. The packaging unit is represented by four vertical broken lines 3 and by a bottom plane 3' which represent means for holding cards with the top surface of one card being adjacent to the bottom surface of the card above it. The packaging unit has a surface through which the cards are placed one by one and a surface through which a plurality of cards can be extracted together, e.g., the cards are placed through the top and withdrawn through a side of the packaging unit, as shown by arrows $F_1$ and $F_2$, respectively. The actual structure of the packaging unit has so far been discussed very generally and shown schematically because anyone with ordinary skill in the art can readily appreciate the many arrangements that can be utilized. Moreover, certain specific structures are described below.

The cards are superposed in the packaging unit with the bottom surface 4 of one card being adjacent to the top surface 5 of the next. To prevent the bottom surfaces of the cards from being damaged where they face an electronic module, as by degassing emanating from the adhesive, divider elements 6 are placed above each memory card as it is put into the packaging unit. As a result, the packaging unit is filled with a plurality of memory cards, there being a separating partition in the form of a divider interposed between each sequential pair of cards, protecting them against the harmful effects due, in particular, to degassing from the adhesive that fixes the module 2 to the card body.

A divider element 6 is sized to overlie at least the area facing the module 2 and which would otherwise thus be exposed directly to the effects of degassing. Divider element 6 also comprises a portion 9 which projects beyond the edge 8 of the cards. Portion 9 may also project beyond one side of the packaging unit. This portion 9 has a hole or eye 7 formed therein. The combination of the portion 9 and its hole 7 is referred to as the fastening means of the divider element.

A divider element 6 is thus placed in such a manner as to overlie the area which is exposed to degassing and, in addition, so that the fastening means can cooperate with one another, i.e., so that all the holes 7 are in alignment, as explained in greater detail below.

A plurality of cards packaged in this way together with a plurality of dividers constitutes a compact unit which can await a subsequent operation without any risk of the cards being harmed. The cards in such a unit can be subjected to various overall operations, such as handling or transfer to another packaging unit or to some other process, or it can be packaged for shipping. Thus, the cards are protected from each other by the dividers which are kept in place until, for example, the degassing ends. It is normally not advisable to keep the dividers in place beyond the time needed to effect protection because subsequent processing of the cards requires that they be readily accessible, but the presence of the dividers in the packaging unit hinders such access.

Figure 2:
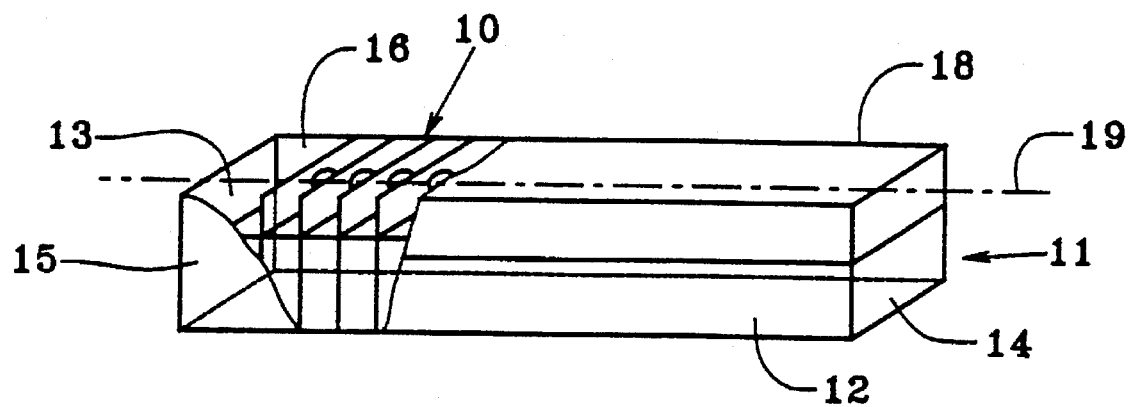
FIG. 2 shows a perspective view of the packaging unit of FIG. 1 containing memory cards.

Prior to the cards being subsequently processed, the dividers must be removed so that the cards can be grouped together. This task is facilitated by inserting an elongated element 19 through the holes 7. The elongated element 19 retains and holds together all of the dividers. To extract all of the dividers simultaneously, it suffices to pull element 19 in direction $F_2$. At such time, the packaging unit is positioned to lie horizontally so that the cards and dividers stand vertically, as shown in FIG. 2. During extraction, the cards are held in the packaging unit by any known means, or merely by gravity.

The material used for the dividers may be made of cellulose, such as paper or fine cardboard. It may also be a plastic material. The function of each divider is to prevent one card from being damaged by another card either by direct contact or by being exposed to effects therefrom, given that the cards are disposed in immediate proximity to one another. Damage can take place even without contact, merely by one card being exposed to the harmful effects of another card. These harmful effects may be of any kind. The selected material for the dividers must be such as to constitute a protective barrier against the harmful effects caused by a card. It must also protect the cards against other types of damage, such as scratching or dust. Its thickness is determined by the same requirements. To provide protection against emanations from an adhesive, a sheet of paper having a thickness of 0.1 mm has been used. Greater thicknesses could be used for achieving sufficient strength so that the divider can withstand the extraction force exerted by the element 19.

FIG. 2 shows a set 10 of cards 1 and dividers 6 placed in a packaging unit for shipping purposes. The specific structure is that of a box 11. It has a bottom 12, two side walls 13 and 14 for holding the cards vertically, and front and back walls 15 and 16. The cards stand on their bottom edges 17 (see FIG. 3) which are in contact with the bottom 12 of the box 11. The dimensions of such a box are such as to enable it to contain several hundred cards. The component parts 12, 13, 14, 15 and 16 are the structural means for holding the cards which are represented schematically in FIG. 1 by numerals 3 and 3'. The back surface of one card is against the front surface of the next card. The walls 15 and 16 are preferably spaced apart by a distance corresponding to the length of the bottom edge 17 of the cards (i.e., the width of card 1 as it is shown in FIG. 3).

Figure 3:
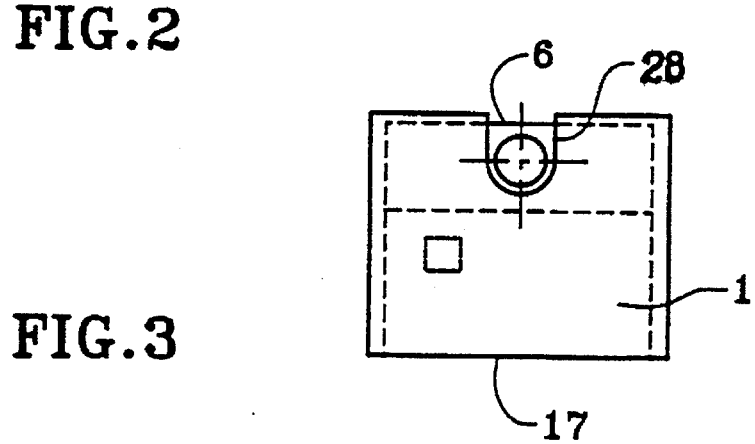
FIG. 3 shows a side view of another embodiment of the packaging unit.

In FIG. 3, there can be seen one embodiment of the box which fully contains the dividers. In an alternative embodiment of the box (not shown), the dividers may optionally project outside the box. In the version shown by FIG. 3, a notch 28 is formed in at least one of the side walls 13 and 14 of the box. Notch 28 is aligned with the axis of the set of holes 7. The entire assembly is covered by a lid 18.

In another embodiment of the invention, the dividers are secured to one another by the box or by the lid of the packaging unit. To this end, the means for securing the dividers are designed to attach to one of the portions of the packaging unit. Of various known means, preference is given to adhesive means.

Figure 4:
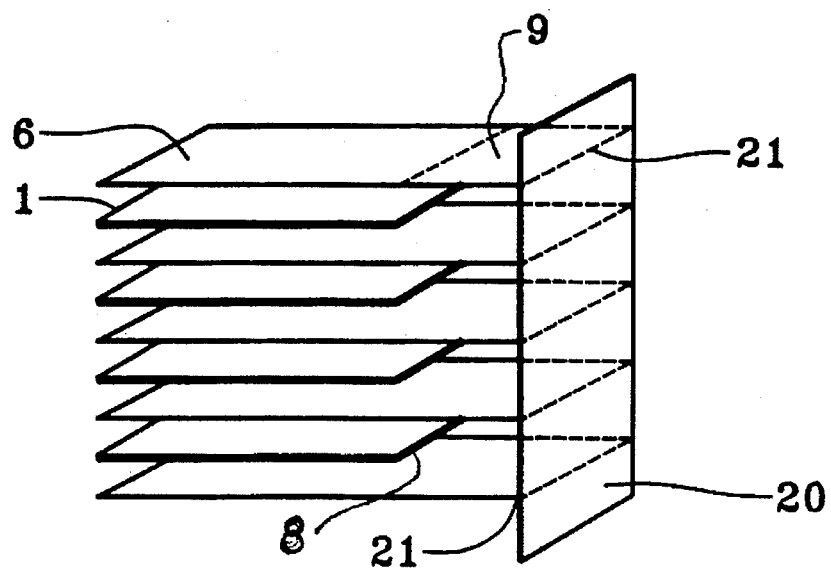
FIG. 4 is a diagram showing one way of connecting the dividers together.

In FIG. 4, it can be seen that each divider 6 has a portion 9 which extends beyond the edge 8 of the cards, e.g., by 1 cm to a surface 20. The end 21 of said portion 9 is fixed to the surface 20 by means of an adhesive, preferably a quick-drying adhesive. Any suitable adhesive means can be used, e.g., double-sided adhesive tape or adhesive threads, or coating the end 21 or the surface 20, or both, with adhesive.

The surface 20 may be a surface of the lid 18 or it may be an intermediate surface designed to itself be fixed to the lid or to the box, e.g., by adhesive.

Figure 5:
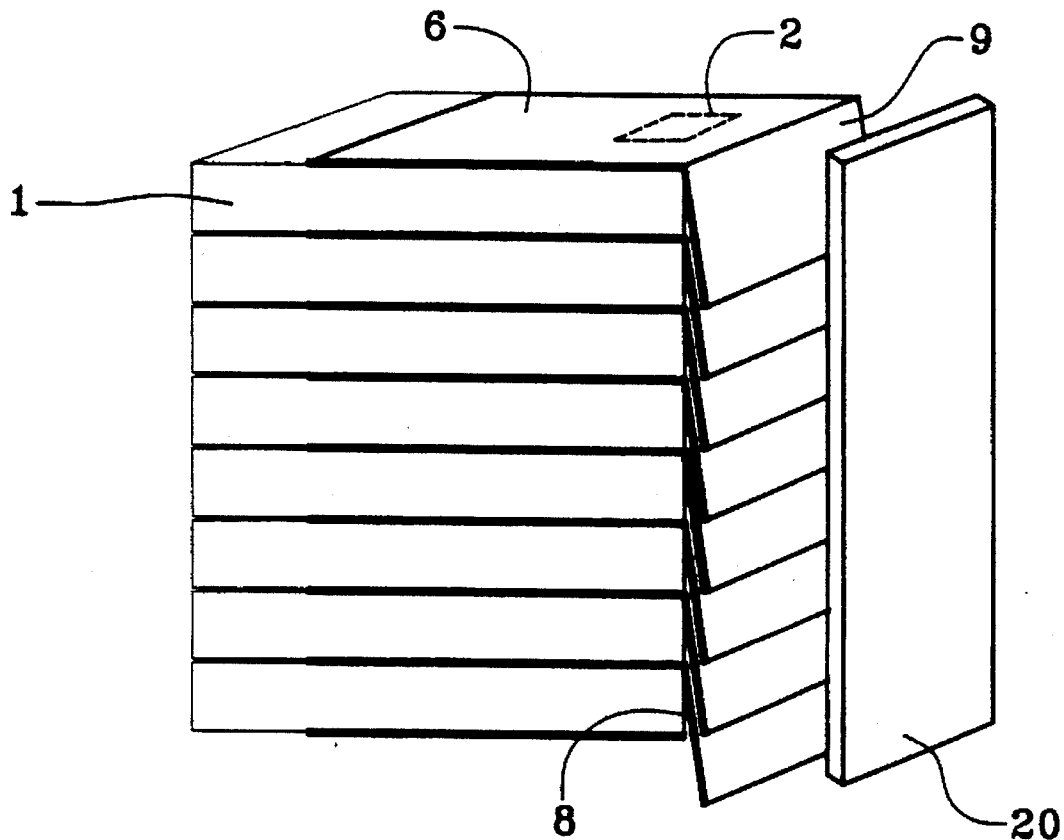
FIG. 5 shows another way of connecting the dividers together.

In FIG. 5, it can be seen that the portion 9 of each divider 6 is folded downwards to overlie edge 8 of the adjacent card 1 so as to cover at least one such edge. The portion 9 preferably overlies the portion 9 of the divider 6 situated beneath it over a distance that represents several card thicknesses, e.g., 5 mm. The folding serves to protect the top edges of the cards from the adhesive. The adhesive may be of the same type as mentioned above.

In this embodiment, each divider portion 9 may have its own adhesive (not shown) on its side which faces outward so as to adhere to the portion 9 overlying it. Thus, not only are the dividers 6 connected directly to one another by the portions 9, but they are also secured together via a surface 20 which may be the bottom of the box 11 or the large surface of the lid 18, or which may merely be a double-sided adhesive strip for fixing them to the box or to the lid.

The portion may optionally be folded around edge 8 and placed against the back 4 of a card 1 without changing the principle of the invention.

For the FIG. 1 embodiment, the user makes use of an elongated member 19 which passes through the holes 7 of a plurality of dividers 6. The ends of the member 19 project from either end so as to allow both ends thereof to be grasped. The member 19 may be a rod that is preferably rigid and tapered at one end in order to facilitate its insertion into holes 7.

For the FIG. 2 embodiment, the rod is inserted directly into the holes 7 above the edge of a side wall (if the dividers extend above the box) or through the notches 28.

In this manner, by means of the elongated member, all of the dividers are connected together. Thereafter, the plurality of dividers 6 can be extracted from the plurality of memory cards stored in box 11 (FIG. 2) merely by pulling the member 19 upward, with the cards remaining in the box in grouped-together form due to their being pulled downward by gravity. It is then easy to take hold of the cards and to handle them as needed for further processing. If necessary, the dividers 6 can be put back among cards 1 after that processing is finished if degassing has not yet completely ended.

It is also possible to insert and fix the rod 19 in place in the packaging unit during a period of storage or transport. This makes it possible to keep the cards and the dividers in place during that period. The fixing of rod 19 may be permanent or otherwise.

Because of the invention, it is possible to fasten together portions 9 of only some of the plurality of dividers. This can be done merely by passing the rod 19 through holes 7 of only selected dividers.

Advantageously, the rod 19 may be fixed to the lid. Thus, on opening the box, the dividers are removed together with the lid.

In the embodiment of FIGS. 4 and 5, the separation operation is greatly simplified by attaching the dividers to either the box 11 or lid 18. In particular, if the dividers are attached to lid 18, all of the dividers can be removed simultaneously as lid 18 is lifted. On the other hand, if the dividers are attached to the box, then box 11 is turned upside down, so that it rests on lid 18. As box 11 is lifted, the dividers come out with it while the cards remain in the lid.

The invention is also applicable to packaging objects that are similar in shape to memory cards.

We claim:

1. In a method of packaging a plurality of cards with opposed surfaces of consecutive cards being adjacent to one another, each of said cards including at least one surface that can be undesirably damaged upon contact with or exposure to another card, said method comprising the steps of:

providing a plurality of divider elements having no surface that can be undesirably damaged, each divider element being formed to have fastening means for enabling each divider element to be secured to other ones of said divider elements;

placing each of said divider elements between two successive ones of said cards in such a manner that each damageable card surface is protected by a divider element, and so that said fastening means cooperate mutually in order to fasten together at least some of the plurality of divider elements.

2. In the method according to claim 1, wherein, prior to performing subsequent processing on said cards or prior to using said cards, the method further comprises the steps of fastening together at least some of the plurality of divider elements and then withdrawing simultaneously the fastened-together divider elements.

3. In the method according to claim 1, further comprising the step of forming said fastening means to include a portion thereof which extends beyond a side edge of each card.

4. In the method according to claim 3, further comprising the step of providing a hole in said portion.

5. In the method according to claim 4, further comprising the step of passing an elongated element through the plurality of divider elements via their respective holes, to thereby fasten the dividers together.

6. In the method according to claim 3, further comprising the step of providing an adhesive on said portion.

7. In the method according to claim 6, further comprising the step of folding said portion at least over an edge of one said card.

8. In the method according to claim 1, further comprising the steps of placing the plurality of cards in a packaging unit and holding the cards in the packaging unit.

9. In the method according to claim 8, further comprising the steps of providing the packaging unit to have a box shape having at least a bottom, two end walls, and two longitudinal walls, and disposing the cards in said box so that a bottom edge of said cards is in contact with the box bottom.

10. In the method according to claim 9, further comprising the step of securing the plurality of divider elements to one of the box and a closure element for the box.

11. A container for retaining a plurality of cards, with opposed surfaces of consecutive cards being disposed adjacent to one another, each of the cards including at least one surface that is undesirably damageable upon contact with or exposure to another card, said container comprising:

a packaging unit for receiving a plurality of the cards such that consecutive ones of the cards have opposing surfaces thereof adjacent to one another; and a plurality of removable divider elements having no surface that is undesirably damageable, each of the removable divider elements being disposed in the packaging unit between two successive ones of the cards so that each damageable card surface is protected by a respective divider element, each of said divider elements including fastening means for fastening together at least some of the plurality of divider elements.

12. The container according to claim 11, wherein the fastening means comprise respective portions thereof projecting beyond edges of the cards and each of said respective portions including a hole.

13. The container according to claim 12, further comprising an elongated element capable of passing through the holes of the divider elements.

14. The container according to claim 13, wherein said elongated element comprises a rigid rod.

15. The container according to claim 12, wherein said packaging unit comprises a box, the cards each having a bottom edge in contact with a bottom of the box.

16. The container according to claim 15, wherein at least one side wall of the box includes a notch that is in alignment with the holes.

17. The container according to claim 11, wherein the fastening means comprise respective portions projecting beyond one edge of the cards and adhesive means on said portions.

18. The container according to claim 17, wherein each of said portions is folded over at least one card edge.

19. The container according to claim 11, wherein said packaging unit comprises a box, the cards each having a bottom edge in contact with a bottom of the box.

20. The container according to claim 19, wherein the fastening means is secured to one of a bottom of the box and a closure element for the box.

* * * * *